United States Patent [19]

Hedges

[11] 3,861,423
[45] Jan. 21, 1975

[54] COLLAPSIBLE FLUID CONDUIT
[75] Inventor: Lee M. Hedges, Somerville, N.J.
[73] Assignee: Johns-Manville Corporation, New York, N.Y.
[22] Filed: Dec. 18, 1972
[21] Appl. No.: 316,150

Related U.S. Application Data
[62] Division of Ser. No. 144,185, May 17, 1971.

[52] U.S. Cl................. 138/119, 138/121, 138/138
[51] Int. Cl............................................. F16l 11/00
[58] Field of Search .......... 138/118, 119, 121, 137, 138/138, 133

[56] References Cited
UNITED STATES PATENTS

| | | | |
|---|---|---|---|
| 789,315 | 5/1905 | Bergstrom | 138/119 |
| 1,991,509 | 2/1935 | Kuballe | 138/118 |
| 2,097,663 | 11/1937 | Hersley, Jr. et al | 138/118 |
| 2,321,064 | 6/1943 | Broedling | 138/138 X |
| 3,109,670 | 11/1963 | Engel | 138/119 X |
| 3,453,008 | 7/1969 | Lejeune | 138/109 X |

FOREIGN PATENTS OR APPLICATIONS
560,270  3/1944  Great Britain...................... 138/121

*Primary Examiner*—Jerry W. Myracle
*Attorney, Agent, or Firm*—Robert M. Krone; John D. Lister

[57] ABSTRACT

This invention relates to the construction of fluid conduit, particularly flexible conduits for use as straight sections, elbows and transitions. Flexible rectangular sheets are reinforced by a plurality of spaced apart, parallel elongate stiffening members coplanar with the sheet means and bonded thereto. The stiffening members are adapted to take angular set upon the sheet being bent whereby opposite sides of the sheet means are adapted to be closed to define a flexible conduit. Insulation in blanket form may be disposed adjacent the sheet means.

4 Claims, 15 Drawing Figures

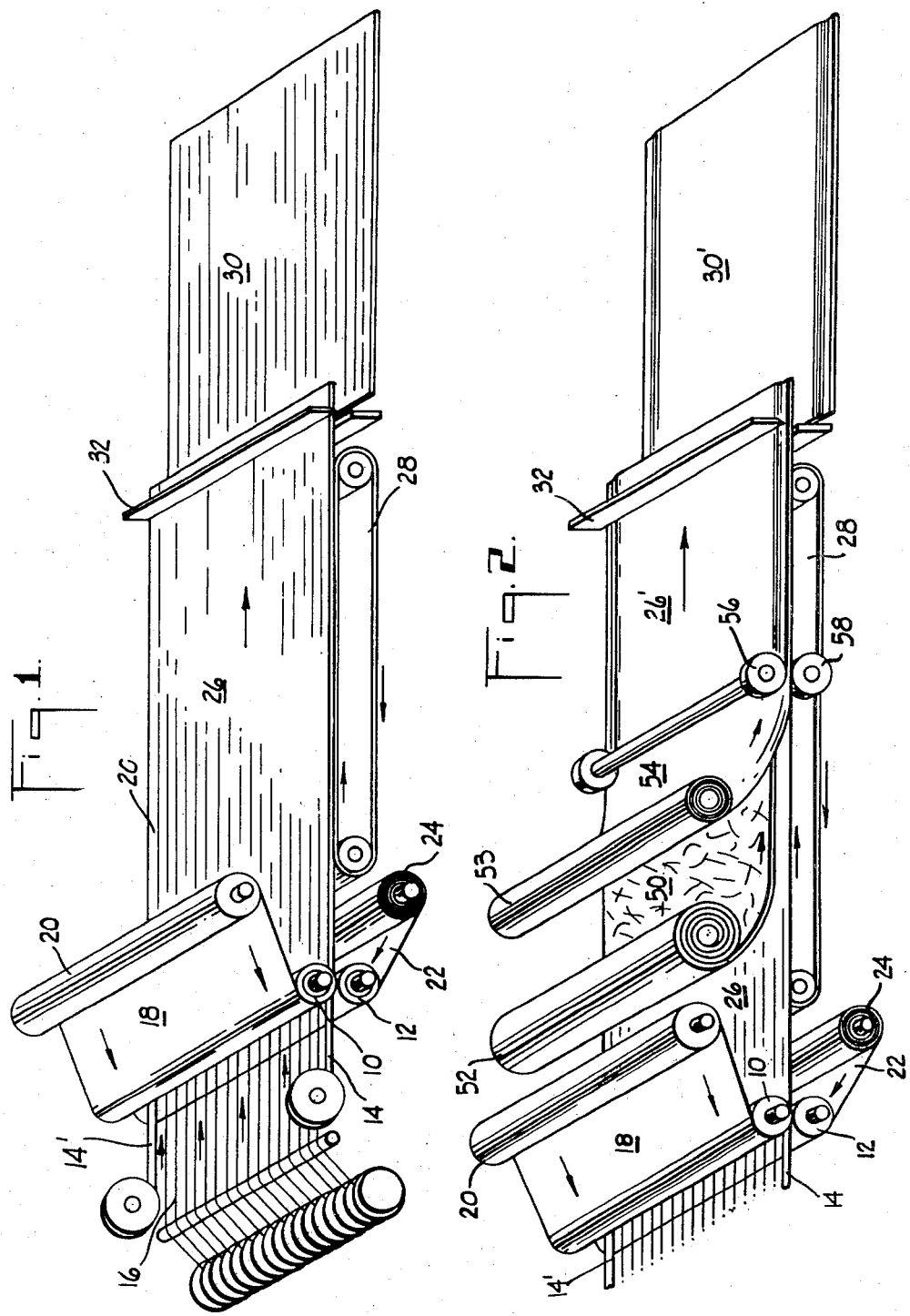

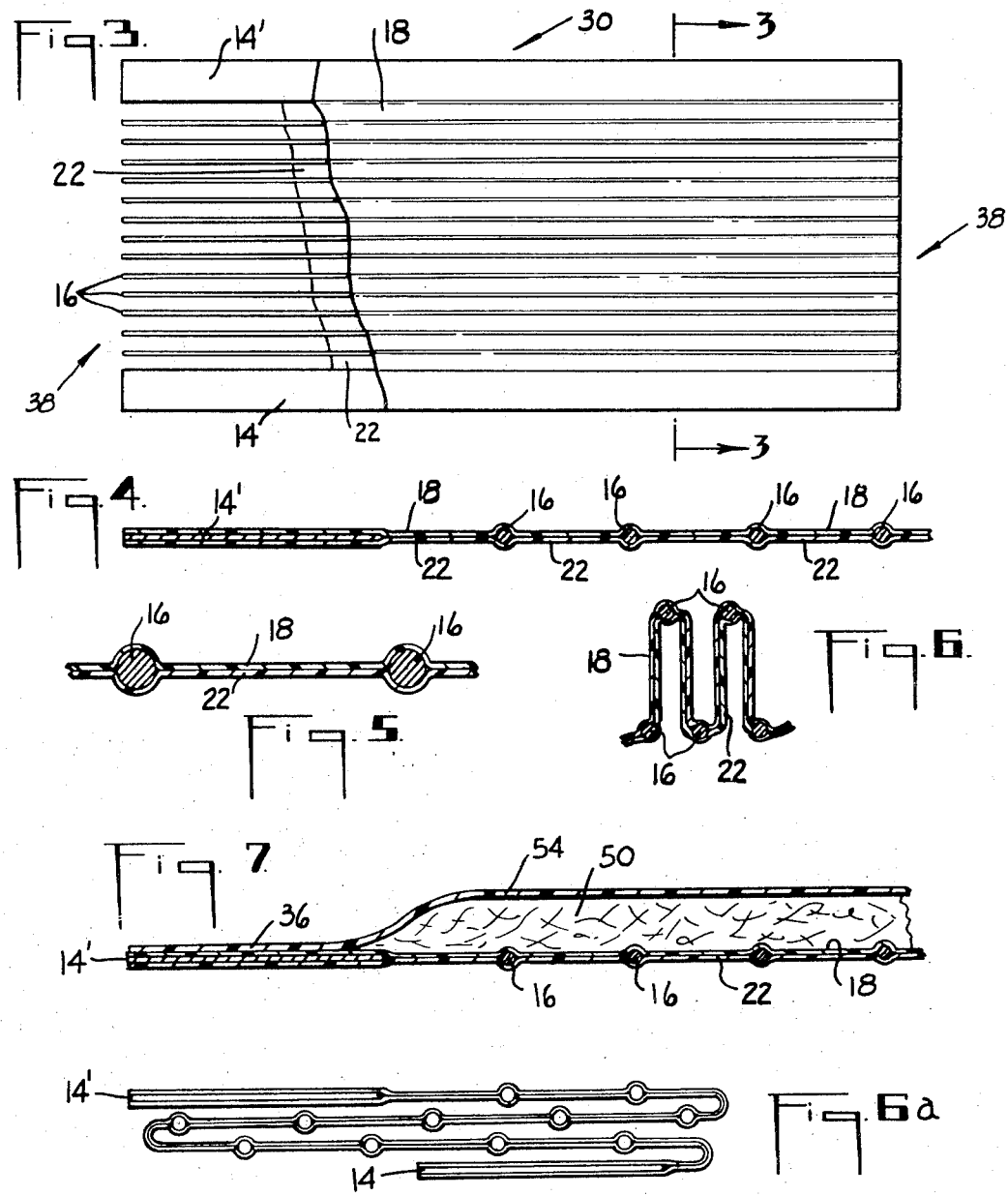

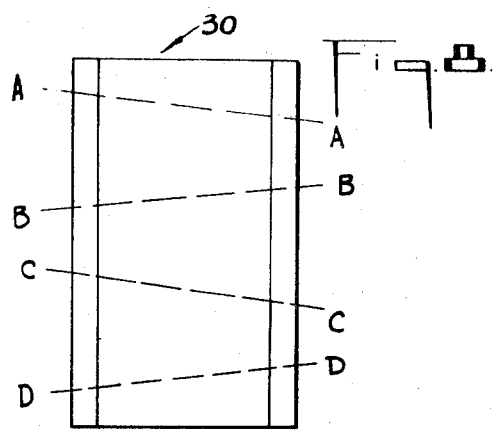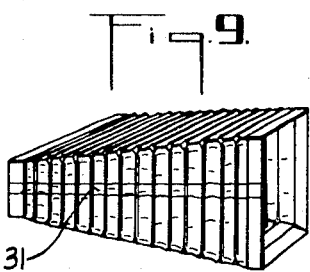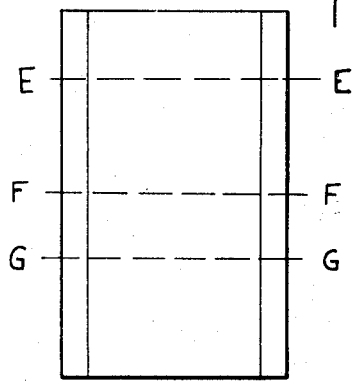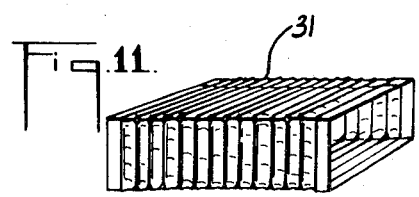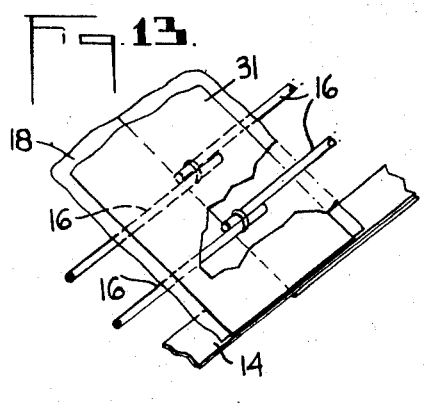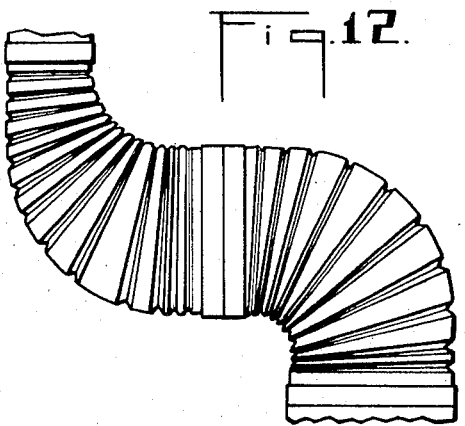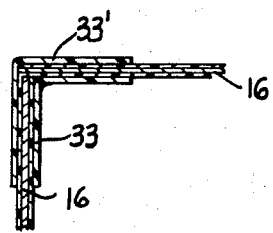

COLLAPSIBLE FLUID CONDUIT

This is a Division of application Ser. No. 144,185 filed May 17, 1971.

BACKGROUND OF THE INVENTION

This invention relates to material for forming flexible fluid conduit, particularly flexible conduit adaptable for establishing elbows and transitions, the method of manufacture and the conduits formed by the material.

Galvanized sheet metal has long been and still remains the staple material from which the vast amount of air ducting is constructed. Ducting formed therefrom comprises straight runs, bends and transitions. In addition to its inflexibility in use, sheet metal ducting has other disadvantages one of which, for example, is the complexity of forming turns, elbows, or transitions. Heavy eqiuipment is required to fabricate sheet metal. This is normally done in a shop because of the requirement of large machines. The formed shapes are then transported to the building site. The use of heavy equipment at building sites for forming sheet metal ducts is not feasible. Transportion of fabricated units from the shop to the erection site is a problem because of bulk.

Flexible fluid conduit exists in the art primarily as continuous helical skeletons covered by flexible sheet material to define a conduit. Such conduits are used for conveying air or vapor laden gases under relatively low pressure. When supplied with insulated walls, they are also adaptable for use to convey air, for example, in air conditioning. This helical construction and the sheet covering material, as with sheet metal, is mainly adaptable for manufacture in a plant under controlled conditions because difficulty is encountered with bulk shipments. There is no convenient and economical way to compress the finished products for shipment.

One form of flexible sheet material for use in forming conduits is disclosed in U.S. Pat. application Ser. No. 826,350, filed May 21, 1969 now U.S. Pat. No. 3,572,865 for Fluid Conduit Arrangement. The assignee of the present invention is also a licensee under application Ser. No. 826,358 now abandoned. The subject matter of application Ser. No. 826,358 presented some difficulties in making a commercially acceptable product. One of these difficulties is that the edge strips 12, 23 or 38 when brought together define a semi-rigid backbone which severely limits the axial compressibility and relative lateral flexibility of a closed conduit. Note, for example, the elbow disclosed in FIG. 4 of the drawing in that application wherein such limitations are obvious. Applicant has developed a commercially acceptable product overcoming the difficulties encountered therein. Specifically, Applicant provides bendable elongate stiffening members which are generally separate and distinct throughout their length (no edge strips) and hingedly connected only by the flexible sheet material. This connection restricts separation of the stiffening members beyond a predetermined spacing but permits their relative movement toward each other. When a conduit is formed by such material, flexibility is not restricted as in application Ser. No. 826,358 and, therefore, amounts to a commercially acceptable product.

Applicant is providing a material which can be shipped to building sites in flat form and there with elementary equipment formed into ducts, fittings, turns and transitions. The material is relatively light and easy to form. Therefore, it lends itself to fabrication at the site of installation.

BRIEF SUMMARY OF THE INVENTION

It is an object of this invention to provide material adaptable for forming into fluid conduit for use as straight sections, bends, elbows and transitions.

It is another object of this invention to provide material for use in forming fluid conduit and having improved flexure characteristics.

It is still another object of this invention to provide the process for making the material.

It is a further object of this invention to provide improved flexible conduit.

BRIEF DESCRIPTION OF THE DRAWINGS

The invention will be more fully understood and further objects and advantages thereof will become apparent when reference is made to the following detailed descriptions of the preferred embodiment of the invention and the accompanying drawings in which:

FIG. 1 illustrates a process for the manufacture of the material disclosed herein;

FIG. 2 illustrates the process of FIG. 1 coupled with an additional process of applying insulating material;

FIG. 3 is a partly cut away top or plan view of the material as formed by the process of FIG. 1;

FIG. 4 is a partial cross-section view of the material taken generally along line 3—3 of FIG. 3, but at substantially full scale;

FIG. 5 is a much enlarged detail showing a sheet material adhered on either side of an elongate stiffening member;

FIG. 6 represents a section of the material having folds or pleats therein;

FIG. 6a is an end view of the material folded for handling;

FIG. 7 is a view similar to FIG. 4 but showing a blanket glass fiber insulation therewith;

FIG. 8 is a plan view of the fabricated material with angularly disposed break lines thereacross where bending is to occur;

FIG. 9 represents a transition formed from the material in FIG. 8;

FIG. 10 is a view similar to FIG. 8 but with transverse break lines;

FIG. 11 is a straight section of fluid duct formed from the material of FIG. 10 and adapted to be flexed to the desired shape such as an elbow;

FIG. 12 illustrates the elbow shape to which the conduits shown in FIGS. 9 and 11 may be flexed or curved and interconnected;

FIG. 13 is a perspective illustration of a closure joint to form the conduit; and FIG. 14 is a fragmentary end view of a conduit illustrating a corner closure joint.

DESCRIPTION OF THE PREFERRED EMBODIMENT

Referring to the drawings and particularly to FIG. 1, there is illustrated the process by which the material disclosed and claimed herein is manufactured. Elongate stiffening means are fed longitudinally between resilient covered upper and lower pressure rolls 10 and 12. Stiffening members, preferably including flat sheet metal end strips 14 and 14', are fed longitudinally into the rolls on either side of a plurality of parallel elongate wire or rod-like members 16. Flexible fluid impervious sheet material 18 from upper roll 20 and similar material 22 from lower roll form 24 are fed around rolls 10 and 12 respectively and converge on opposite sides of the stiffening members. The sides of the sheet which face each other are provided with a pressure sensitive adhesive which upon passing through the pressure rolls are brought together under pressure to sandwich stiffening members 14, 14' and 16 therebetween. The sheets are adhered together so as to secure the stiffening members in position. The resulting composite laminar material 26 is carried along by traveling conveyor 28 and is transversely severed into desired lengths of conduit wall-forming material 30 by means such as a shear 32.

FIG. 3 represents a rectangular piece of material 30 cut away to expose interior configuration. As previously indicated, flexible sheets 18 and 22 are adhered together on either side of the stiffening members by pressure sensitive adhesive. The finished material 30 is collapsible in one direction but is stiffened in a direction transverse thereto. These pieces are adpated to be bent in a manner whereby their sides 38 are brought into adjacency or together and closed to define a conduit or passageway.

The arrangement of FIG. 2 is substantially that of FIG. 1, but with additional apparatus and material located generally above conveyor 28 for applying insulation. Insulation 50, such as glass fiber blanket, is fed from roll 52 onto the top of laminar material 26 at the same rate of linear travel. A cover sheet of flexible material 54, similar to sheets 18 and 22, is likewise fed from a roll 53 onto the top of the insulation at the same rate of linear travel. The surface of sheet 54 which faces blanket 50 is provided with a pressure sensitive adhesive, at least along its opposite sides. Insulation 50 is slightly narrower than material 26 and flexible cover sheet 54. Therefore, the sides of sheet 54 are adhered to the face of material 26 as they pass between paired pressure rolls 56, 58 located on either side of the conveyor 50, so as to retain the insulation therebetween. This insulated material, identified by the numeral 26', moves along conveyor 28 (as does material 26 in FIG. 1) to shear 32 where it is cut into lengths 30'. The difference between material 30 and 30' is that material 30' includes insulation.

FIG. 4 is a cross-sectional view taken partially along line 4—4. The stiffening members are generally unitary and unattached to each other except by the flexible sheet portions which extend therebetween. It will be noted in FIGS. 5 and 6 that portions 18 and 22, inasmuch as they are flexible, define a hinge between rods 16. These hinge portions restrict lateral separation of the elongate stiffening members beyond a predetermined spacing but permit the elongate members to move toward each other, therefore, permitting the material to be collapsed edgewise in a direction transverse to the longitudinal extent of the stiffening members. A section of the material in collapsed form and showing the hinging arrangement is illustrated in FIG. 6. The hinging arrangement is further illustrated in FIG. 6a where the material is folded upon itself as may be required for ease of handling. The material is adapted to be shipped either in a folded or flat form.

The elongate stiffening members provide substantial rigidity to the material in the direction in which they extend. They are adapted for bending so that spaced apart portions thereof, such as sides 38, are adapted to be closed to form a conduit. The elongate members are adapted to take a permanent set upon being bent angularly beyond a predetermined amount. Break or bend lines are illustrated in FIGS. 8 and 10 wherein the elongate stiffening members, i.e., strips 14, 14' and wires or rods 16, are bent at 90°.

The formed conduits whether straight, FIG. 11, or tapered, FIG. 9, are each adapted to be formed into various shapes. They may be bent on a radius and joined as illustrated in FIG. 12, or they may be twisted or otherwise moved in any of the three dimensions for establishing a connection with other conduit or openings. Considerable latitude of movement between opposite ends of the conduit is possible.

FIG. 7 is a cross-sectional view similar to FIG. 4 but including a blanket of insulation. Like numerals are applied to similar or common components. Glass fiber blanket 50 is retained in position by cover sheet 54 which is bonded to sheet material 18 along the end over strip 14'. The sides of glass fiber blanket 50 are left exposed after having been severed by shear 32.

In FIG. 8 angularly disposed break line A—A, B—B, C—C and D—D are illustrated on a rectangular piece of conduit wall forming material 30. The resulting transition conduit is illustrated in FIG. 9. The ends of strips 14, 14', rods 16, and sheet material 18, 22 may be connected by mechanical means such as staples or by pressure sensitive tape 31 to retain the conduit form.

A similar arrangement is shown in FIG. 10. When the material is bent at 90° along break lines E—E, F—F and G—G a rectangular conduit is defined as shown in FIG. 11. As before, staples and/or tape 31 retain the opposite sides closed in mechanically stable form.

In the perspective illustration of FIG. 13, there is shown tape 31 which seals and retains a joint between the overlapping flexible sheets. Staples may clamp opposite ends of the stiffening members with tape 31 thereover. Or, tape 31 alone with a pressure sn sensitive surface may alone establish the joint.

A corner joint is illustrated in FIG. 14 wherein opposite sides of the material are brought together at a 90° corner. Pressure sensitive tapes 33 and 33' seal the corner joint both inside and out. Staples are not normally required when closure of the material is made along one corner.

The bending along indicated break lines and mechanical closure to define a conduit has been illustrated with uninsulated material 30. The process for forming insulated material 30' does not substantially differ. The same breaks and closing of opposite sides to define a conduit are required. It may be desirable to remove a small side strip of exposed glass fiber insulating blanket 50 prior to closing the sides to form a conduit having a neat joint. Material 30' is bent in a manner so that the insulation appears on the outside of the conduit.

The conduit formed by the material disclosed herein is collapsible in its axial direction. It is also flexible in all lateral directions. The conduit is flexible around its entire periphery, and is not encumbered by a semi-rigid backbone or seam. The conduit can be used for straight runs, curves, elbows or transitions. The invention is defined by the claims which follow.

I claim:

1. A flexible conduit which can be axially collapsed comprising:

a. inner, intermediate, and outer flexible walls, said inner wall defining the enclosed passage of said conduit, said outer wall defining the external surface of said conduit, at least one of said walls being fluid impervious, b. a plurality of unitary wire stiffening loops which retain a permanent set upon being bent disposed intermediate said inner wall and said intermediate wall, said stiffening loops being adjacent and bonded at spaced-apart locations to at least one of said inner and intermediate walls, said stiffening loops lying in planes substantially perpendicular to the longitudinal axis of said conduit whereby radial collapse of the conduit is prevented, c. a layer of thermal insulation between said intermediate wall and said outer wall, and d. collars at the ends of the conduit for facilitating the connection of said conduit to adjacent conduits.

2. The conduit as defined in claim 1 wherein the collars include flat metal strips.

3. The conduit as defined in claim 1 wherein the wire stiffening elements are metal wires.

4. The conduit as defined in claim 1 wherein the thermal insulation is a glass fiber mat.

* * * * *